United States Patent [19]

Abbott

[11] 4,016,641
[45] Apr. 12, 1977

[54] METHOD OF ADAPTING A MOBILE HOME FOR AN AIR CONDITIONER

[75] Inventor: Roy W. Abbott, Louisville, Ky.

[73] Assignee: General Electric Company, Louisville, Ky.

[22] Filed: Mar. 8, 1976

[21] Appl. No.: 664,664

Related U.S. Application Data

[62] Division of Ser. No. 541,665, Jan. 16, 1975, Pat. No. 3,973,939.

[52] U.S. Cl. ............................................. 29/469
[51] Int. Cl.² ........................................ B23P 21/00
[58] Field of Search ............. 29/428, 469; 62/237, 62/262, 448, 449; 296/23 R

[56] References Cited
UNITED STATES PATENTS

| | | | |
|---|---|---|---|
| 2,525,868 | 10/1950 | Corhanidis | 62/449 X |
| 3,206,943 | 9/1965 | Rice et al. | 62/448 X |
| 3,292,246 | 12/1966 | Nielsen | 29/469 X |
| 3,324,534 | 6/1967 | Spurk | 29/469 X |
| 3,566,614 | 3/1971 | Dmral | 62/262 |
| 3,570,108 | 3/1971 | Sarra | 29/469 |
| 3,712,078 | 1/1973 | Maynard et al. | 62/448 |
| 3,849,866 | 11/1974 | Mol | 29/469 |
| 3,855,814 | 12/1974 | Eubank | 62/237 X |
| 3,884,048 | 5/1975 | Schneider | 62/448 X |

Primary Examiner—Charlie T. Moon
Attorney, Agent, or Firm—Frank P. Giacalone; Francis H. Boos

[57] ABSTRACT

The present invention provides an air conditioning system for a mobile home and a method of adapting a mobile home for removably receiving an air conditioning unit. The system includes securing a mounting means to the support structure of the mobile home and an air conditioning unit that is adapted to be removably secured to the mounting means. When installed on the mounting means, the air conditioning unit is aligned to deliver conditioned air into the interior of the mobile home through its built-in air distribution system.

9 Claims, 10 Drawing Figures

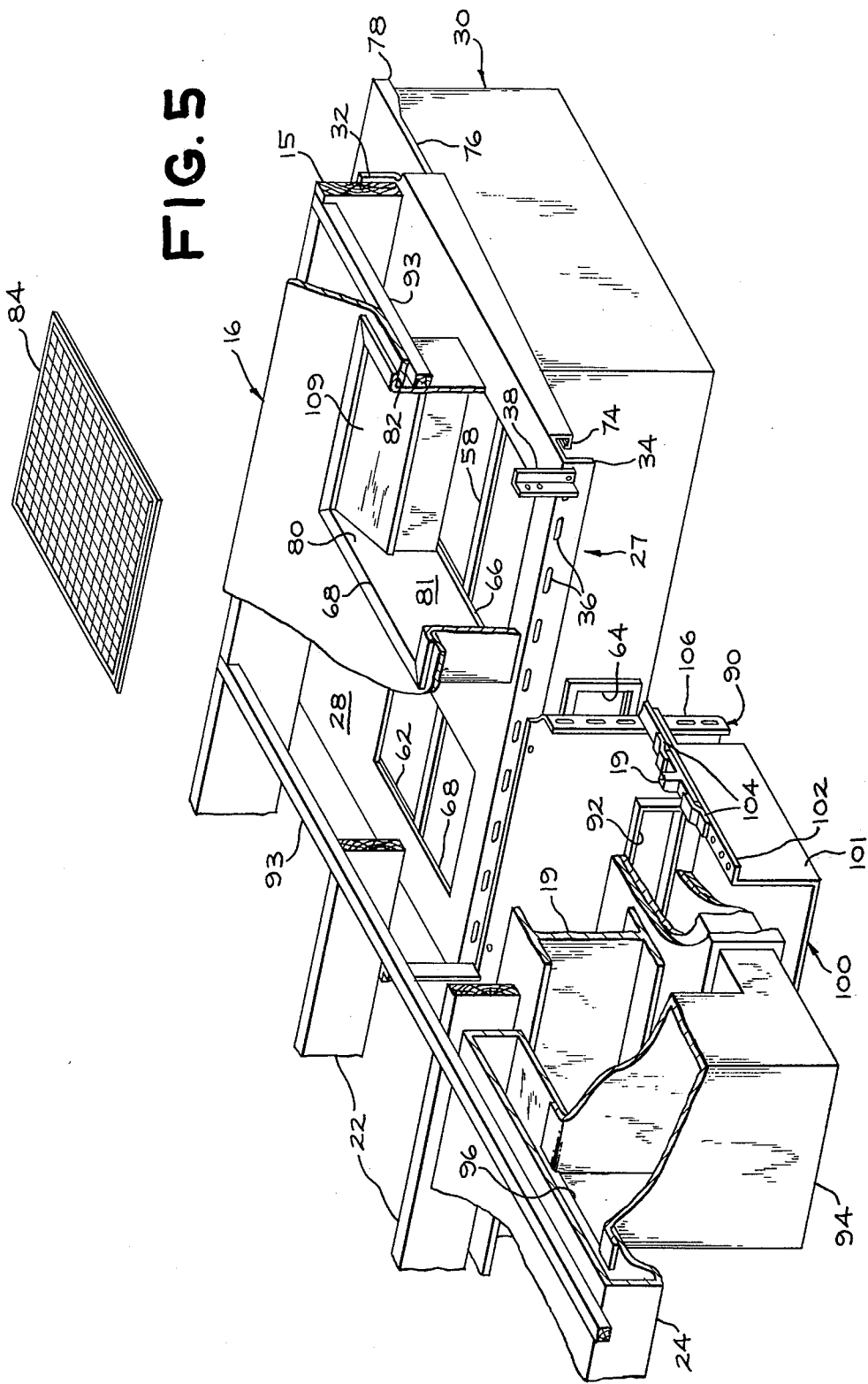

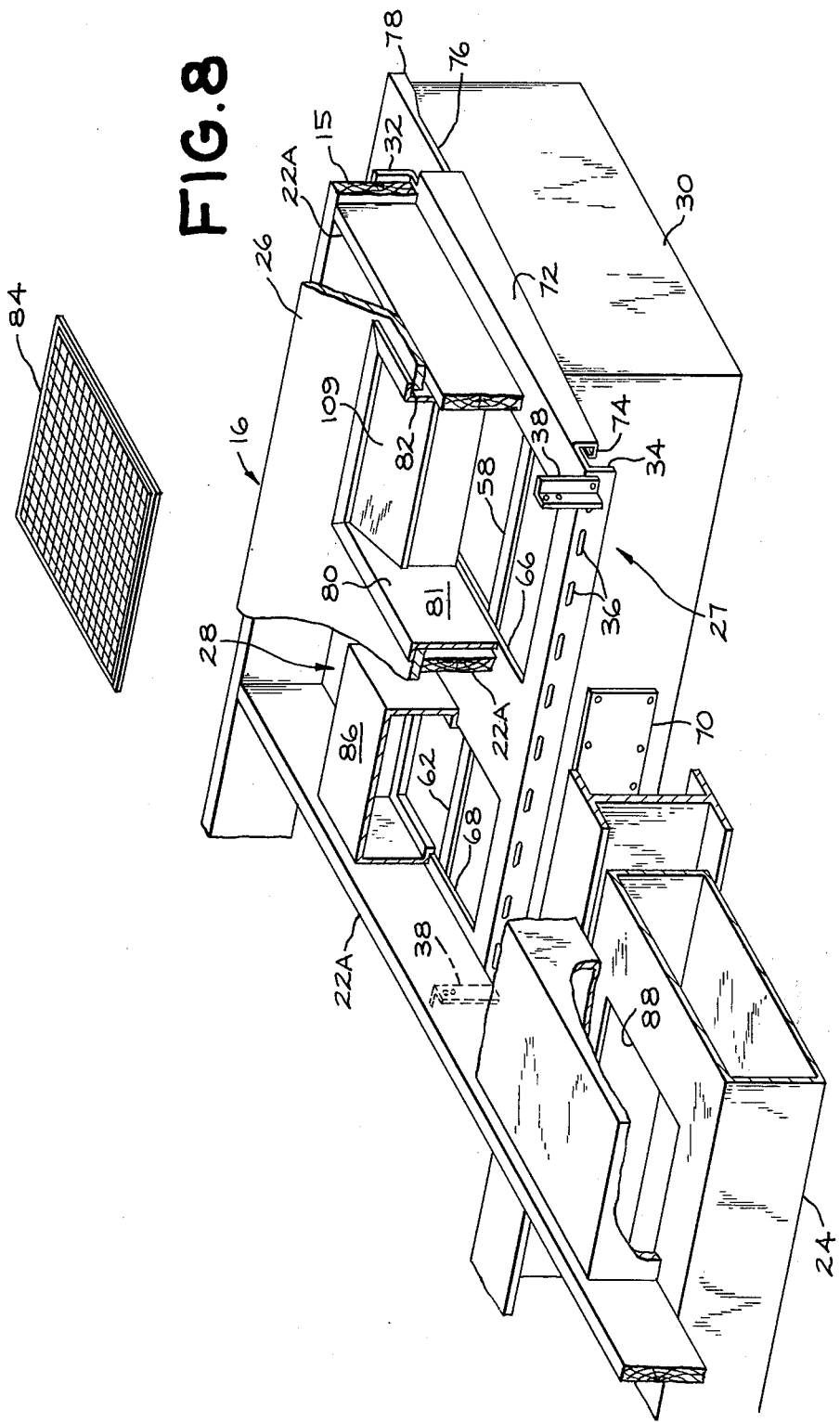

METHOD OF ADAPTING A MOBILE HOME FOR AN AIR CONDITIONER

CROSS REFERENCE TO RELATED APPLICATION

This application is a division of copending patent application Ser. No. 541,665 for "Air Conditioning System For A Mobile Home" filed Jan. 16, 1975, now U.S. Pat. No. 3,973,939 in the name of Roy W. Abbott, and assigned to the assignee of this application.

FIELD OF THE INVENTION

The present invention relates to an air conditioning system to be used in a mobile home and more particularly to an air conditioning unit that is adpated to deliver air to the interior of the mobile home through its own built-in air distribution system. Provision is made during construction of the mobile home to accommodate a mounting or adaptor means that is located in the support structure of the mobile home and arranged to communicate with the air distribution system of the mobile home. When properly located in the mounting means, the air delivery outlet of the air conditioning unit is aligned to deliver air to the air distribution system of the mobile home.

The air conditioning unit when used is removably secured to the mounting means with its air outlet and inlet areas positioned to deliver air into the mobile home air distribution system.

DESCRIPTION OF THE PRIOR ART

Traditionally, air conditioning units when used in mobile homes require the use of cumbersome, flexible duct work to connect the unit into the air distribution system of the mobile home. In many installations, the exposed flexible duct work would be installed in a manner that would be considered unsightly, but more importantly, they are delicate and are therefore susceptible to physical damage.

U.S. Pat. No. 3,566,614—Imral provides a low-profile air conditioning unit that may be positioned under the mobile home. However, when the air conditioning unit, as taught in the above patent, is placed under the mobile home, the unit must then be connected into the mobile home air distribution system, which is an additional expense in both material and labor. Furthermore, the unit must still be connected by either the customary light-weight, delicate, flexible ducting or the more expensive rigid, sheet-metal ducting which when used would have to be fabricated and dimensioned for each installation requirements.

U.S. Pat. No. 3,712,078—Maynard provides a refrigeration unit including two covers, one solid and the other having a plurality of openings that are adapted to be used as inlet and outlet openings for circulating air from a removably mounted refrigeration unit into a refrigerator cabinet. The covers are dimensioned to be interchangeably secured to the bottom or top of the refrigeration unit, so that it may be positioned to supply refrigerated air upwardly when it is located in the bottom of the cabinet or downwardly when it is located above the cabinet.

U.S. Pat. No. 3,206,943—Rice et al shows a refrigeration unit arranged or adapted to be removably positioned in the bottom of a refrigerator cabinet. The refrigeration unit package is provided with rollers that cooperatively engage a track positioned on the cabinet wall that permits locating the refrigeration inlet and outlet openings into proper alignment with appropriate air distribution flues in the refrigerator cabinet.

While both of the above-mentioned U.S. Pat. Nos. 3,712,708 and 3,206,943 provide removably arranged refrigeration units relative to refrigeration cabinets, it should be noted, however, that the combination of both cabinet and refrigeration unit are necessary to provide a functional product. In the present invention, an air conditioning unit is provided that is adapted to be installed in a mobile home, that is, a completely self-contained and usuable product independent of the air conditioning unit which may be provided as an accessory.

U.S. Pat. No. 2,525,869—Corhanidis discloses a refrigeration system that is removably mounted on a railroad car. The refrigeration unit is received in rails that are mounted on a frame that in turn is inserted into the floor of the chamber to be cooled. The frame has inlet and outlet ports formed therein. The chamber to be cooled may be provided with a conduit for receiving and distributing the cooled air. The above patent does not show nor teach the provision of a mounting means that can be used with a distribution system in a mobile home which may include a plurality of zones partitioned or isolated from each other. The use of the system disclosed in U.S. Pat. No. 2,525,869 in conjunction with a mobile home would require a frame for each zone to be air conditioned.

The construction of the mobile home support structures relative to the partitions separating the zones together with the various sizes of the zones would make the system disclosed in the above cited patents impractical.

The present invention provides a method and apparatus wherein an adaptor plate is installed in the mobile home during its construction and, optionally, at some later or subsequent time, an air conditioning unit that is adapted to be removably received in the adaptor means may be supplied and installed in the adaptor plate in alignment and cooperation with the air distribution system of the mobile home.

SUMMARY OF THE INVENTION

By this invention, there is provided an air conditioning system for use in a mobile home and a method of adapting a mobile home for removably receiving an air conditioning unit. The mobile home includes the customary support structure which carries the mobile home living quarters and an air distribution system providing an air inlet into the interior of the living quarters of the mobile home.

A mounting means is secured to the mobile home support structure at the time the mobile home is constructed. The mounting means is so arranged and constructed that it is adapted to slidably receive the air conditioning unit at some later time. The mounting means further provides air communication means from the air conditioning unit air delivery outlet to the mobile home air distribution system and for the air returning from the interior of the mobile home to the air conditioning unit air-return inlet when the air conditioning unit is properly located in the plate.

It is therefore an object of the invention to provide a system for air conditioning a mobile home and the method of adapting the mobile home to removably receive a self-contained air conditioning unit.

BRIEF DESCRIPTION OF THE DRAWINGS

FIG. 5 is an exploded perspective view showing the mobile home base structure of FIGS. 3 and 4;

FIG. 8 is an exploded perspective view showing the mobile home base structure of FIGS. 2, 3 and 4;

DESCRIPTION OF THE PREFERRED EMBODIMENT

Figure 1:
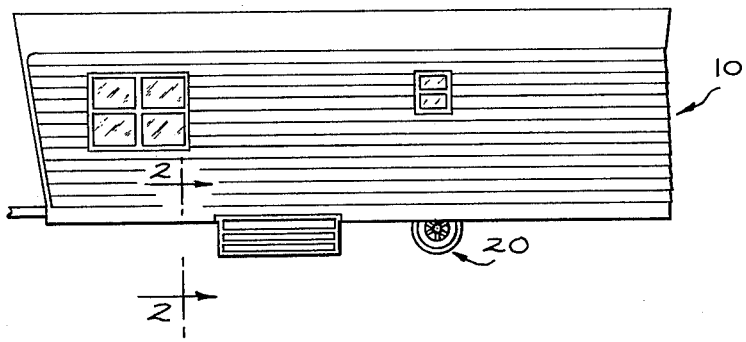
FIG. 1 is a side elevational view of a typical mobile home adapted with the present system.
Figure 2:
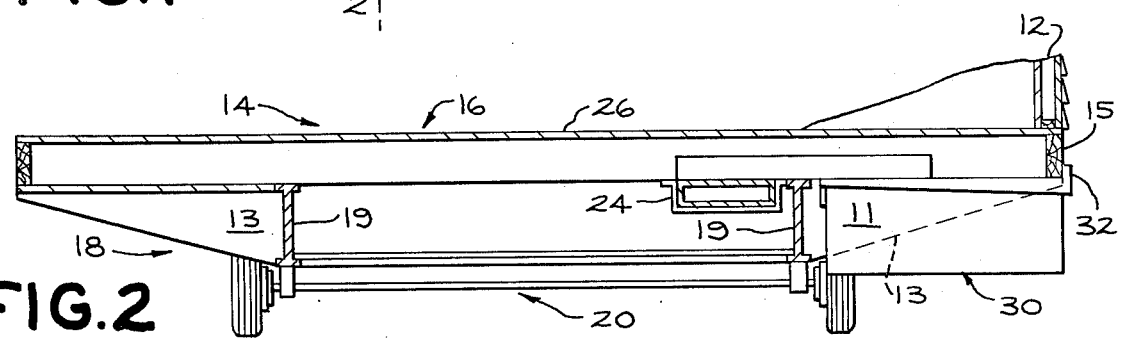
FIG. 2 is a sectional view taken along lines 2—2 of FIG. 1.

Referring now to FIGS. 1 and 2 of the drawings, a mobile home 10 having side walls 12 is supported on a base structure 14. The base structure 14 includes a floor section 16 mounted on or carried on a support frame 18 which may be mounted on a wheel assembly 20 for transporting the mobile home from one location to another.

While the base structure 14 configurations may vary with manufacturers of mobile homes, two basic and accepted forms used by manufacturers of mobile homes will herein be described in conjunction with the present invention. The support frame 18 usually includes parallel spaced main support I-beams or members 19 arranged longitudinally with respect to the mobile home 10. The beams 19 are spaced or located inwardly from the outer side walls 12 of the mobile home 10 to provide a support area 11. In order to provide adequate support for the entire width of the mobile home 10 including the portion between the beam 19 and side walls 12, side support members 13 are spaced longitudinally and are secured to the beams 19. The side support members 13 project laterally outwardly so that the free ends are adjacent the outer edge of side walls 12 and support side beams 15 located directly under the outer walls 12.

Figure 6:
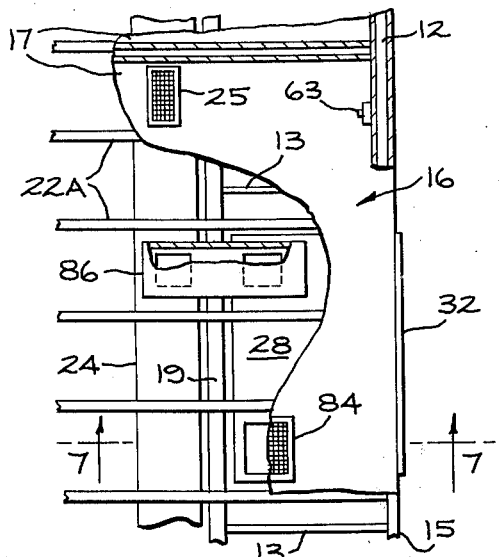
FIG. 6 is a plan view similar to FIG. 3 showing the mobile home base structure of FIG. 2.
Figure 3:
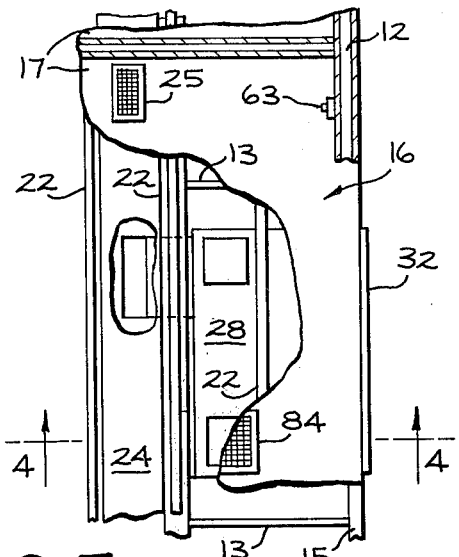
FIG. 3 is a partial plan view with parts broken away.
Figure 7:
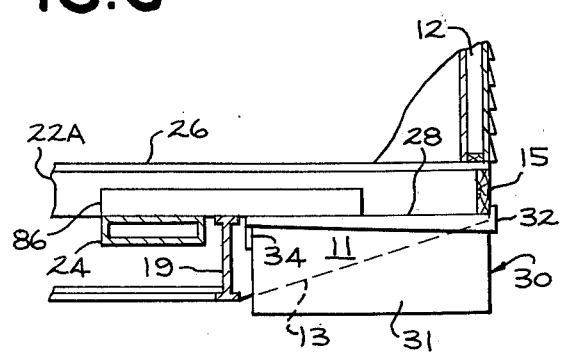
FIG. 7 is an elevational view taken along lines 7—7 of FIG. 6.
Figure 4:
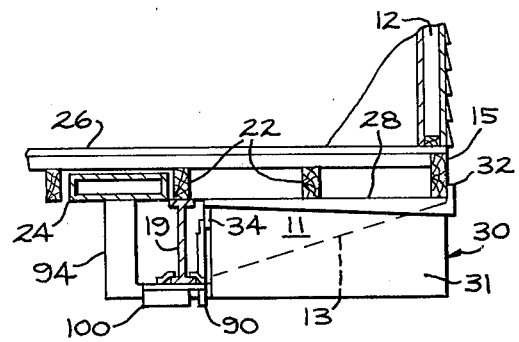
FIG. 4 is an elevational view taken along lines 4—4 of FIG. 3.

In one type of mobile home construction, the floor section 16 includes floor support members or joists 22, as shown in FIGS. 3, 4 and 5, that are arranged parallel with the support beams 19 and side beam 15 in a spaced relationship across the width of the mobile home. The mobile home is customarily provided with a forced air heating furnace (not shown) which distributes heated air to the various rooms, or zones 17, to be heated through an air distribution system main duct 24. The duct 24 is arranged longitudinally extending usually substantially the full length of the mobile home, and may include air-delivery outlets 25 in each or selected ones of the zones 17 to be heated. In this arrangement, the air distribution system main duct 24 used in conjunction with the heating system of the mobile home 10 is arranged between floor joists 22, that is, between the floor 26 of the mobile home and the upper surface of the support member 19 or may be supported below them. In another type of mobile home construction, and more specifically the floor support section 16, as shown in FIGS. 6, 7 and 8, the floor support joists or members 22A are arranged transverse to and are supported on the support member 19. The longitudinally positioned air distribution system duct 24 in this configuration is arranged below the floor joist 22A and in the plane, or between the dimension defined by the upper and lower ends of the support members 19. In either floor section configuration the distribution duct 24 is arranged in the area between the I-beams 19.

In accordance with the present invention, an air conditioning unit 30 (FIGS. 5, 8 and 9) is adapted to be used in conjunction with the mobile home air distribution system duct 24. To this end, aligning and mounting means 27 are provided in either type of floor section 16 construction. The aligning means 27 includes a mounting means or adaptor plate 28 (FIGS. 5 and 8) secured to the underside of the floor section 16 during the manufacture of the mobile home. The air conditioning unit 30 employed in the present system is capable of circulating conditioned air through the mobile home and is arranged to be removably received in the adaptor plate 28.

The plate 28 is conveniently located in the support area 11, as shown in FIGS. 3 and 6, between members 13 in one or more locations in the mobile home, depending on the size of the mobile home, the number of zones to be conditioned, and the preference of size and capacity of the air conditioning unit.

The back or rear edge of the plate 28 (FIGS. 5 and 8) is provided with an upwardly projecting flange 32 which is secured against the outer side of support beam 15 below wall 12 of the floor section 16. The front or forward edge of the adapter plate 28 is provided with a downwardly extending flange 34 which includes a series of elongated slots or openings 36. Secured in the slots 36 are angle or support brackets 38 which may have their other ends secured to the floor support joist 22 or 22A. The brackets 38 are similarly provided with a plurality of holes which, together with the slots 36, allow a great degree of vertical and longitudinal flexibility of the forward end of plate 28 with respect to the spacing and dimensions of the joist 22 or 22A.

Figure 9:
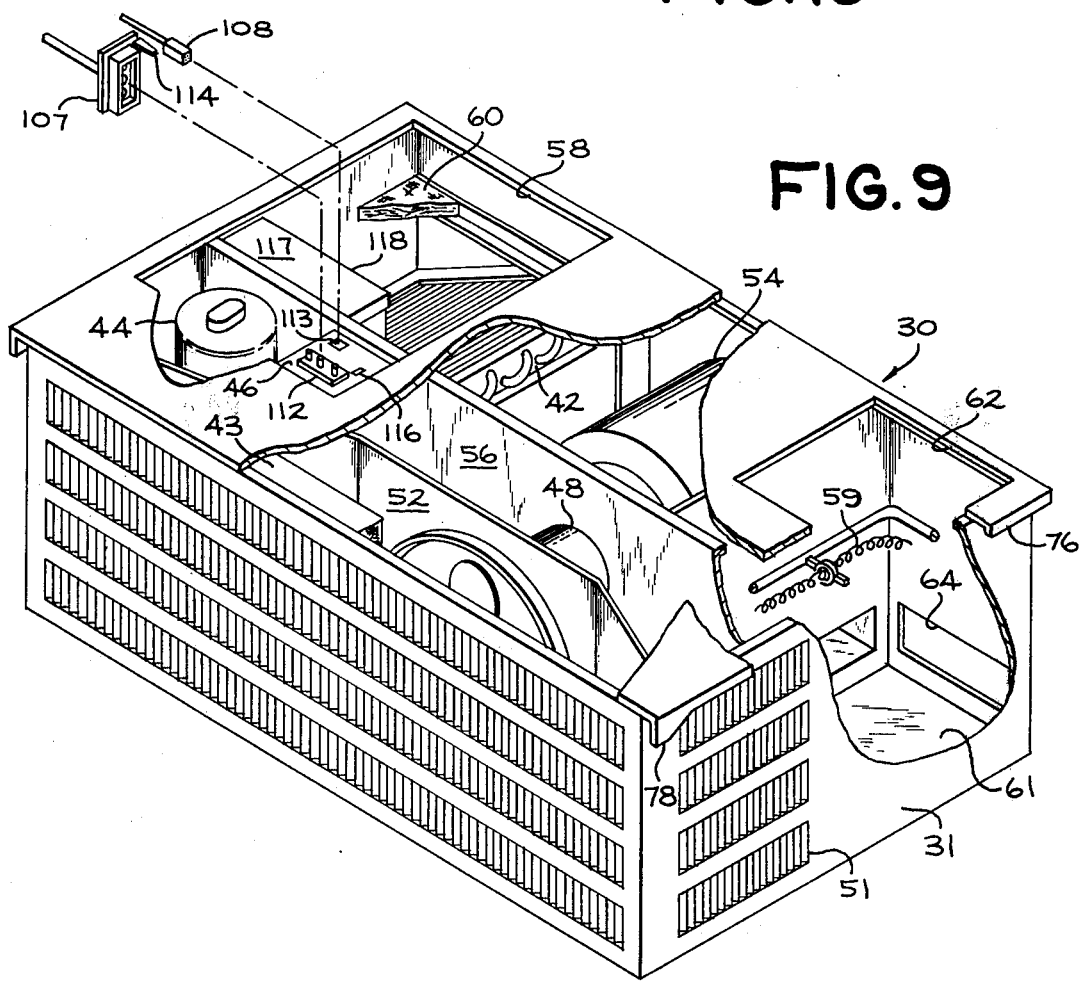
FIG. 9 is a perspective view of the air conditioning unit employed in the present system.

Referring now to FIG. 9, the air conditioning unit 30 to be used in conjunction with the mobile home 10 and its distribution system duct 24 is a self-contained unit arranged in a cabinet 31 and includes the customary refrigeration system having an evaporator section 42, condenser 43, compressor 44, power supply or control section 46, a motor 48 for driving fan 50 arranged in an opening, in a barrier 52. The fan 50 moves air in through an opening 51 in the side wall of the cabinet 31 and through the condenser 43 on the other side of the barrier 52 and out through louvers arranged in the rear wall of cabinet 31. The motor 48 is of the double-shaft type and also drives a blower 54 arranged in the other side of a barrier 56 which is the main barrier dividing the cabinet 31 into the customary indoor-outdoor sections. The blower 54 draws air through a return inlet 58 arranged in the cover or upper wall of cabinet 31 through an appropriate filter 60 (FIG. 10), evaporator 42, and into a discharge chamber 61 which includes air discharge outlet 62 arranged in the upper wall and an outlet 64 arranged in the forward wall respectively of cabinet 31. As will be explained hereinafter, the choice of outlets 62, 64 will be based on which type of floor construction 16 the mobile home includes and the adaptor plate 28.

The air conditioning unit 30 used in conjunction with the present embodiment of the present invention may be of the type that provides both cooling and heating, in which event the mobile home heating furnace may not be installed or used. In order to supply heated air to the mobile home the air conditioning unit may be of the reverse cycle, heat pump type or alternately as shown in FIG. 9, a resistance heater 59 may be arranged in the path of discharge air in the chamber 61. It should be understood that when the air conditioning unit provides both cooling and heating, a heating furnace may not be supplied and the air distribution duct 24 may be segmented depending on the number of air conditioning units used and the number or locations of the zones. As will be hereinafter explained in detail, the air conditioning unit 30 is controlled by a temperature responsive thermostat means 63 arranged conveniently in one of the mobile home zones 17.

The aligning means 27 and more specifically the adaptor plate 28, used in the floor section construction shown in FIGS. 6, 7 and 8, is provided with an air-return opening 66 arranged, as will be hereinafter explained, to communicate with the interior of the mobile homes and an air outlet 68. It will be noted that the opening 66, as will be hereinafter explained in detail, aligns with opening 58 while opening 68 aligns with opening 62 when the air conditioning unit is fully located in the adaptor plate 28. In this embodiment, the air conditioning outlet 64 is not employed and is covered with an appropriate plate or cover 70.

To properly insure the alignment of the openings 58 with 66 and opening 62 with 68, the adaptor plate 28 is provided with a depending track or support means 72 projecting downwardly along the parallel side walls of the plate 28. The track 72 is provided with a raceway 74 formed to receive a guide member 76 (FIGS. 5, 8 and 9) projecting from the upper side edges of the upper wall of the air conditioning unit cabinet 31. The raceway 74 is formed so that it inclines upwardly from the flange 32 end of the plate 28. The guide member 76 has a downwardly projecting cam member 78 formed on its trailing edge.

In operation, that is, during the insertion of the air conditioning unit guide member 76 into the raceway 74 of the adaptor plate 28, the leading or forward edge of the guide member 76 rides upwardly in the raceway 74 toward the underside of the plate 28 with the cam member 78 engaging the open rear end of the raceway 74 just prior to the complete insertion of the air conditioning unit 30. During the last portion of the insertion process, the cam member 78 causes the rear or trailing end of the air conditioner to be raised as it is completely inserted into the raceway 74 so that the top wall of the cabinet 31 is parallel to and against the plate 28 with the appropriate openings 58, 66 and 62, 68 engaged in a sealed air transfer position.

Figure 10:
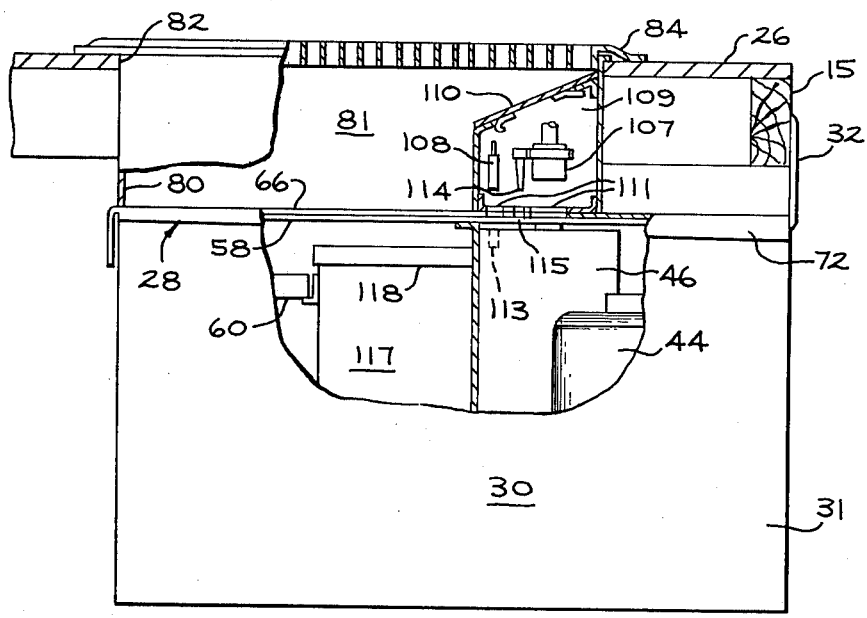
FIG. 10 is a sectional elevational view with parts broken away showing the air conditioner in its installed position.

In order for the blower 54 to draw air from the interior of the mobile home, means are provided to connect air-return openings 58 and 66 with an opening 82 in the floor 26 of the mobile home. Accordingly, as seen in FIGS. 5, 8 and 10, the air-return openings 66 and 58 are aligned by a suitable ducting 80 which defines an air-return passageway or opening 81 in the floor section 16. The opening 82 may be provided with an appropriate removably arranged grille 84.

By the present invention, the aligning means 27 also includes air communication means for delivering air from the aligned outlets 62, 68 to the distribution system main duct 24. To this end (FIG. 8), during construction of the mobile home the outlet 68 of plate 28 is connected through an air conduit or passageway means 86 to an opening 88 on the upper wall of the air distribution system main duct 24. It should be noted that in this type of mobile home construction the air conduit 86 is located between transversely arranged floor joists 22A and across the top of support member 19. The duct 80 and conduit 86 like the plate 28 are installed during the construction of the mobile home. As can readily be understood, the conduit 86 provides a means for aligning the opening 68 in plate 28 of aligning means 27 and more specifically, the air conditioning air outlet 62 with the distribution system duct 24 so that cooled air from the air conditioner may be delivered through duct 24 into selected zones or zones to be cooled, while the duct 81 provides means for aligning the air conditioner air return inlet with an appropriately located opening 82 in the selected zone to complete the recirculation of air through the selected mobile home zone. It should be noted that during construction of the mobile home, appropriate removable cover members (not shown) are arranged over the openings 66 and 68 in plate 28 to prevent leakage of air from the mobile home distribution system duct 24 and interior of the mobile home during normal operation of the heating system in the event an air conditioning unit is not installed. In the event an air conditioning unit is required for the mobile home, the covers are removed from openings 66, 68 and the air conditioning unit 30 is inserted on the tracks 72 at that time.

The aligning means 27, and more specifically the adaptor plate 28, employed in the floor construction of the mobile home 10 shown in FIGS. 3, 4 and 5, provides means for connecting the air outlet 64 of the air conditioner unit 30 into communication with the air distribution duct 24. It should be apparent that the longitudinal arrangement of joists 22 in this type of construction precludes the positioning of a conduit for connecting the air conditioning unit with the mobile home air distribution system across the top of the beam 19. Accordingly the air communication means from the air conditioner air delivery outlet to the air distribution system duct 24 is arranged to extend across the bottom of support member 19.

To this end, the aligning means 27 provides a bulkhead or plate 90 which includes an opening 92 secured to the flange 34. The plate 90 extends downwardly so that the opening 92 is located below the lower edge of beam 19. The opening 92 is adjusted into horizontal alignment with opening 64 by positioning the plate 90 in the slots 36 of flange 34. The vertical adjustment to align openings 92, 64 is accomplished by the positioning of brackets 38 relative to the cross members 93 secured to the joist 22.

Further, in this type mobile home construction, communication between the air conditioning unit 30 and duct 24 is effected by an air conduit means 94. The conduit 94 extends from the opening 92 across the bottom edge of beam 19 and then upwardly to an opening 96 in the mobile home air distribution duct 24. Alternatively the opening 64 in the cabinet 31 may be located in the side wall and the plate 90 arranged adjacent the side wall with duct 94 extending across the bottom of beam 19 as hereinbefore described.

Means are provided to support and position the duct 94 on the beam 19 so that duct 94 is axially aligned with opening 92 on the plate 90. Accordingly, the duct 94 rests and is supported on the bottom wall portion of a U-shaped sleeve member 100. The upper ends of the side wall portions 101 of the sleeve 100 are provided with outwardly projecting flanges 102. The sleeve 100 is secured to the beam 19 by a pair of clamps 104 that are secured to each of the flanges 102 and are appropriately shaped to engage the lower oppositely projecting leg portion of the I-beam 19. This clamping arrangement provides longitudinal adjustment along the I-beam 19 while the placement of the clamps 104 in appropriate holes arranged in the flanges 102 provides horizontal axial adjustment relative to opening 92. The sleeve 100 is secured in appropriately selected openings in a vertically arranged flange 106 formed in the plate 90 to support the aligned conduit 94 between the bottom wall of sleeve member 100 and the beam 19. As can readily be understood the conduit 94 provides a means for aligning the opening 92 in plate 90 of the aligning means 27 and more specifically the air conditioning air outlet 64 with the distribution system duct 24.

By the present mobile home air conditioning system, access is provided to certain essential electrical control and operating components of the air conditioning system from the interior of the mobile home. Accordingly, various service functions may be performed without necessitating the removal of the air conditioner from its adaptor plate.

Referring now to FIGS. 9 and 10, it will be seen that access to the filter 60, control section 46, compressor 44, and a control box 117, is provided from the interior of the mobile home and more specifically through the air-return opening 82. To this end the opening 58 is dimensioned to extend beyond the evaporator side of barrier 56 to expose compressor 44 and control section 46.

A power cord, including a high-voltage plug 107 which is connected to the mobile home power supply (not shown), and a low-voltage cord, including a low-voltage plug 108 is connected to a temperature control means or thermostat (not shown), are conveniently arranged in an electric component or storage area 109 located in air-return passageway 81 below the grille 84. The area 109 is provided with a protective cover 110 which is accessible with the removal of grille 84. The plug area 109 is arranged over the control section 46 when the air conditioner is fully positioned in the plate 28. The bottom wall of the area 109 is provided with openings 111 which align with high-voltage receptacle 112 and low-voltage receptacle 113 mounted in the control section 46. To electrically connect the air conditioner 30 to the power source and to the appropriate temperature control means of the mobile home, cover 110 is removed or rotated to its open position and plugs 107, 108 are inserted through openings 111 and into receptacles 112 and 113 respectively.

As can easily be understood that with the electrical connection made and plugs 107, 108 projecting through opening 111, a mechanical interlock is provided in that the air conditioner cannot be removed until plugs 107, 108 are removed from receptacles 112 and 113. However, to increase the integrity of the interlock and to satisfy certain codes, a mechanical interlock means is provided. To this end, a pin 114 attached to the high-voltage plug 107 is dimensioned to extend through an opening 15 of the bottom wall of area 109. At the time plug 107 is inserted into receptacle 112, pin 114 is arranged to be received in an opening 116 in section 46, thereby providing a mechanical interlock between the removably arranged air conditioning unit 30 and the plate 28 secured to the mobile home 10. It should be understood, however, that while the pin 114 is attached to the plug 107 it may be associated with plug 108, or alternatively, plugs 107, 108 may possibly be combined, with the pin 114 being associated with the combined plug. The above arrangement, however, does provide an interlock when the air conditioner is electrically connected to the power source that is effective in preventing the removal of the air conditioner 30 from the plate 28.

Also accessible as hereinbefore mentioned through the air-return passageway 82 is the control box 117 which is located in the evaporator side of barrier 56. The control box 117 may contain circuit terminal check points and other electrical components that may require periodic inspection and is provided with a protective cover 118.

It is apparent from the foregoing that many of the service functions that may be necessary regarding the maintenance of air conditioner 30 including inspection of filter 60 may be carried out from the inside of the mobile home through the air-return passageway 81 and, more specifically, without removing the air conditioner 30 from the plate 28.

Referring to FIGS. 3, 6 and 9, the insertion of low-voltage plug 108 into receptacle 113 completes a low voltage circuit to the thermostat 63 that is effective to control the operation of the air conditioning to maintain a preselected temperature in the zone or zones 17. In the event more than one air conditioning unit 30 is employed in the mobile home 10 a separate thermostat 63 may be provided for each of the units or a central control may be utilized. The specific arrangement of the temperature control may vary with each installation.

In summary it should be apparent from the foregoing description that an air conditioning system and method are provided for air conditioning a mobile home that includes installing a mounting means during construction of the mobile home for adapting the mobile home to removably receive a self-contained air conditioning unit. The mounting means further includes air communication means for connecting the air conditioner in air communication with the distribution system duct of the mobile home.

While there has been shown and described a specific embodiment of the invention, it will be understood that it is not limited thereto and it is intended by the appended claims to cover all such modifications as fall within the true spirit and scope of the invention.

What is claimed is:
1. The method of adapting a mobile home having at least one zone to be air conditioned, a base structure, air distribution means associated with said base structure including air outlets positioned in said zone, for removably receiving a self contained air conditioning unit in air delivering alignment with said air distribution means which comprises:

securing an adaptor plate mounting means to said base structure for removably receiving said air conditioning unit;

connecting an air delivery system between said adaptor plate and said air distribution means.

2. The method as set forth in claim 1 including the step of providing an electric connector associated with the power supply of said mobile home, said connector being located in said mounting means.

3. The method as set forth in claim 1 including the step of providing a low voltage connector associated with a temperature responsive means in said mobile home is located in said mounting means.

4. The method as set forth in claim 1 including the step of providing an electric connector associated with the power supply of said mobile home, and, a low voltage connector associated with a temperature responsive means in mobile home are arranged in said mounting means.

5. The method of air conditioning a mobile home having at least one zone to be air conditioned, a base structure, air distribution means associated with said base structure including air outlets positioned in said zone, for removably receiving a self-contained air conditioning unit in air delivering alignment with said air distribution means which comprises:

securing an adaptor plate mounting means to said base structure for removably receiving said air conditioning unit;

connecting air delivering means between said adaptor plate and said air distribution means; and inserting said air conditioning unit in said adaptor plate so that said air conditioning unit is in alignment with said air delivering means for circulating air into said mobile home zones through said air distribution means.

6. The method as set forth in claim 5 including the step of providing an electric connector associated with the power supply of said mobile home, said connector being located in said mounting means.

7. The method as set forth in claim 5 including the step of providing a low voltage connector associated with a temperature responsive means in said mobile home is located in said mounting means.

8. The method as set forth in claim 5 including the step of providing an electric connector associated with the power supply of said mobile home, and, a low voltage connector associated with a temperature responsive means in mobile home are arranged in said mounting means.

9. The method of claim 2 wherein the adaptor plate means is secured to said base structure during construction of said mobile home.

* * * * *